No. 780,066. PATENTED JAN. 17, 1905.
F. W. SARGENT.
BRAKE BLOCK.
APPLICATION FILED APR. 6, 1904.
4 SHEETS—SHEET 1.
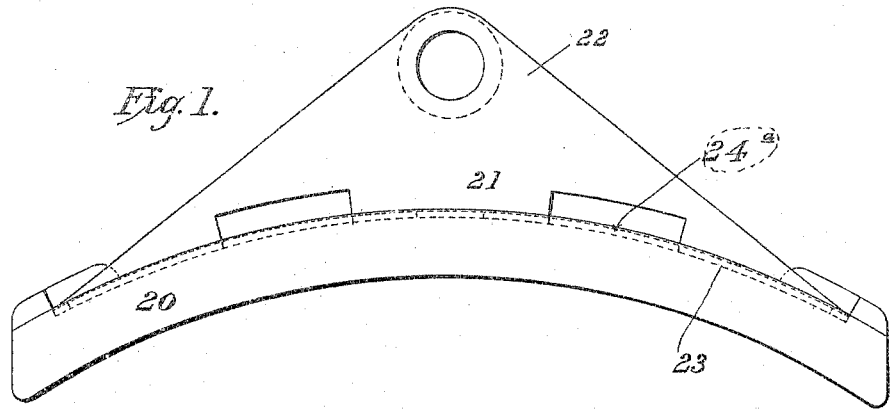
Fig. 1.
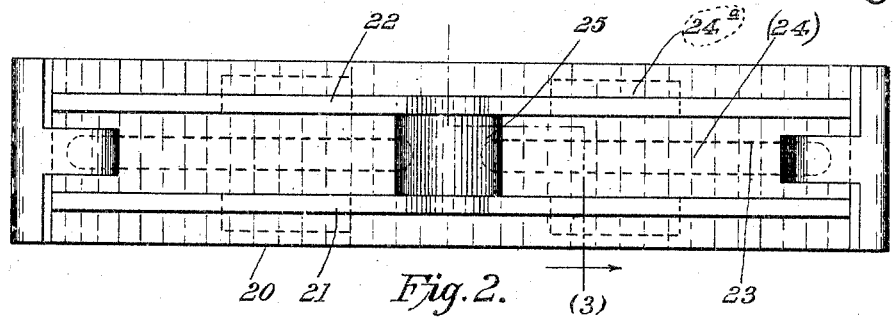
Fig. 2.
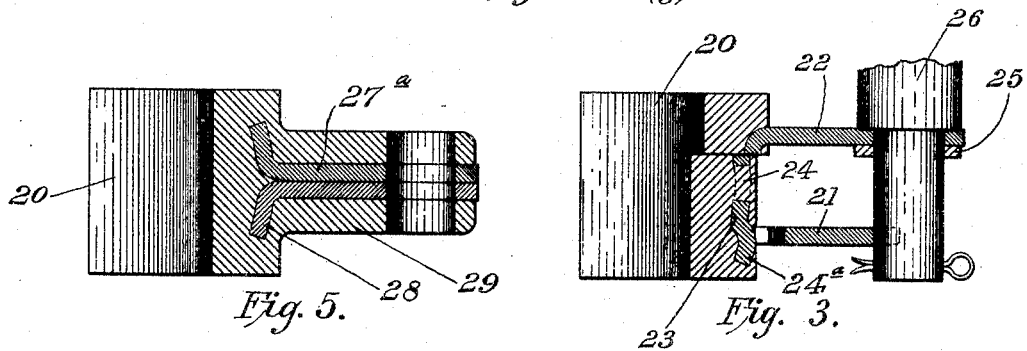
Fig. 5.   Fig. 3.
Fig. 6.   Fig. 4.
Witnesses,
Chas. H. Ebert
A. Martin
Inventor,
Fitz William Sargent
per Paul Synnestvedt
Attorney.

No. 780,066. PATENTED JAN. 17, 1905.
F. W. SARGENT.
BRAKE BLOCK.
APPLICATION FILED APR. 6, 1904.

Witnesses;
Chas. H. Ebert
A. Martin

Inventor,
Fritz William Sargent
per Paul Synnestvedt
Attorney.

No. 780,066. PATENTED JAN. 17, 1905.
F. W. SARGENT.
BRAKE BLOCK.
APPLICATION FILED APR. 6, 1904.
4 SHEETS—SHEET 3.
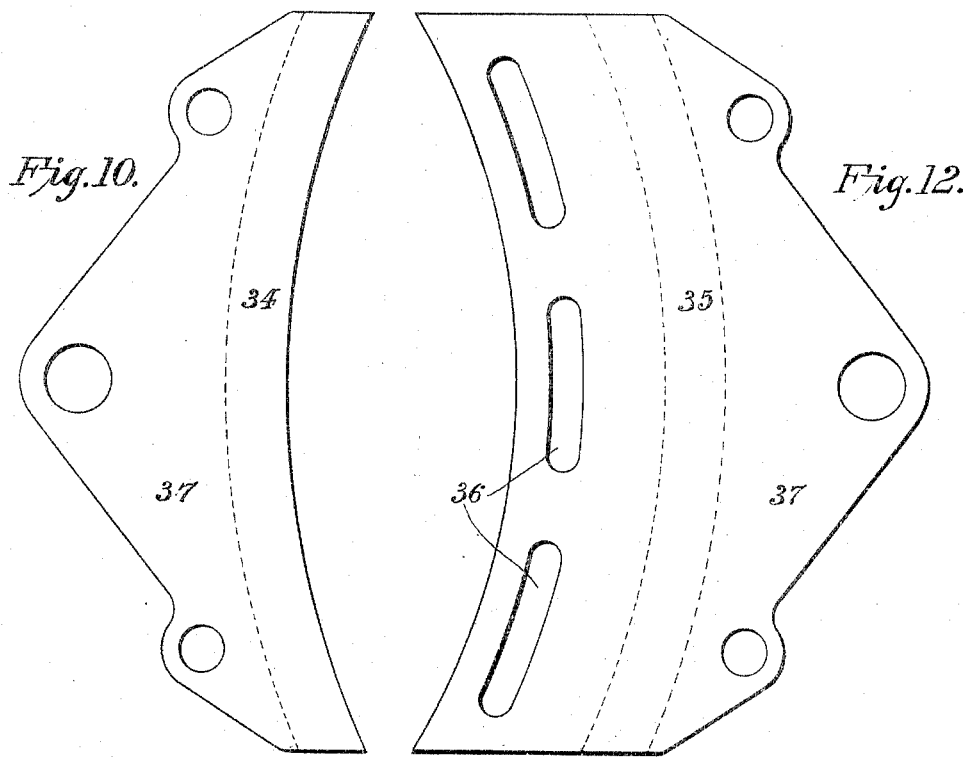
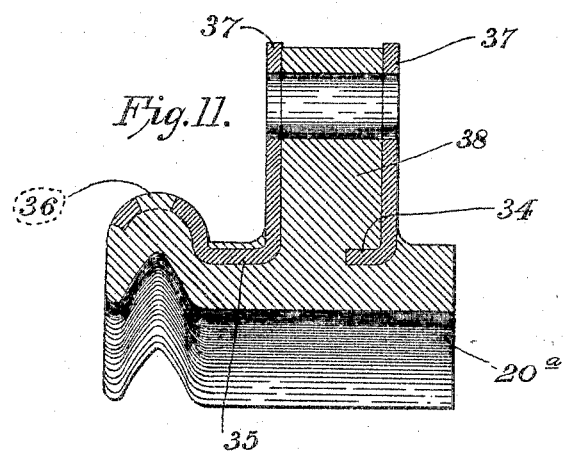

No. 780,066. Patented January 17, 1905.

UNITED STATES PATENT OFFICE.

FITZ WILLIAM SARGENT, OF MAHWAH, NEW JERSEY, ASSIGNOR TO AMERICAN BRAKE SHOE & FOUNDRY COMPANY, OF JERSEY CITY, NEW JERSEY, A CORPORATION OF NEW JERSEY.

BRAKE-BLOCK.

SPECIFICATION forming part of Letters Patent No. 780,066, dated January 17, 1905.

Application filed April 6, 1904. Serial No. 201,921.

*To all whom it may concern:*

Be it known that I, FITZ WILLIAM SARGENT, a citizen of the United States, residing at Mahwah, in the county of Bergen and State of New Jersey, have invented certain new and useful Improvements in Brake-Blocks, of which the following is a specification.

My invention relates to wheel brakes for railway cars and the like, and particularly to the blocks upon the ends of the brake beam or lever for frictionally engaging the wheel. The objects of the invention are, to do away with the separate brake head and combine the wearing shoe with devices attachable directly to the brake support; to provide a combined brake block and wearing sole with superior means for attaching it to the brake support; to provide a ductile metal brake block with a cast metal wearing sole thereon; to provide a superior support for a cast wearing sole on the brake block, and to generally improve and cheapen the structure and efficiency of railway brakes. These objects, together with other advantages which will hereinafter appear, I attain by means of the construction illustrated in preferred forms in the accompanying drawings, wherein—

Figure 1 is a side elevation of a combined brake head and shoe, or brake block, containing one form of my improvements;

Figure 2 is a top plan view of the same brake block;

Figure 3 is a cross section on the line (3) of Figure 2, also illustrating the attachment of the brake beam to the block;

Figure 7:
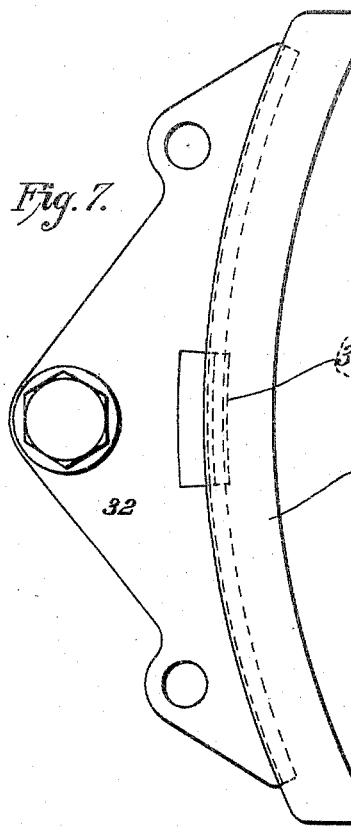
Figure 8:
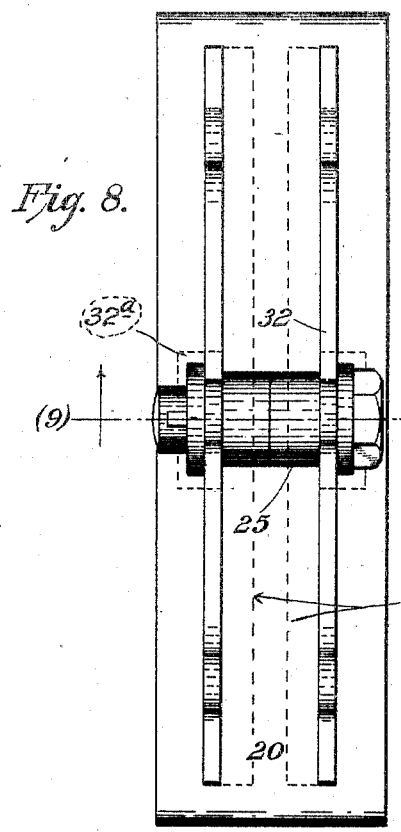
Figure 9:
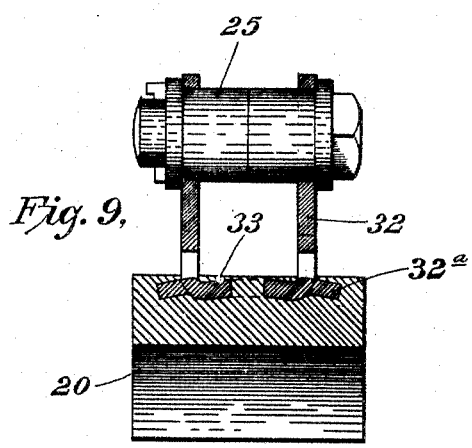
Figure 13:
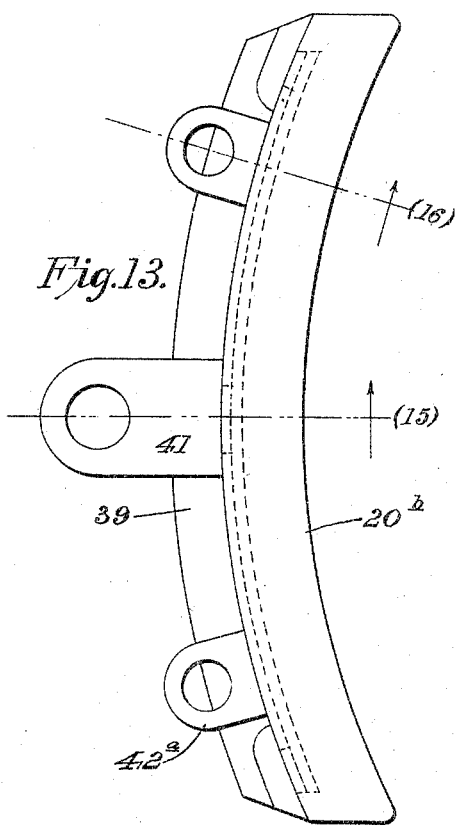
Figure 14:
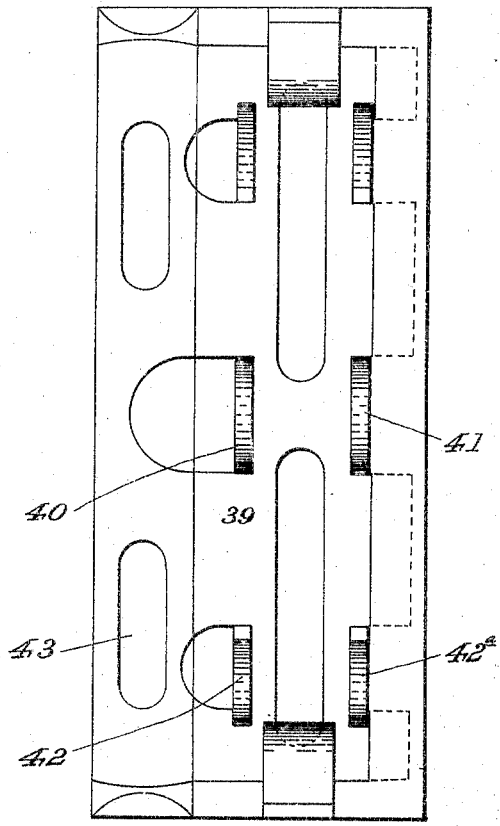
Figure 15:
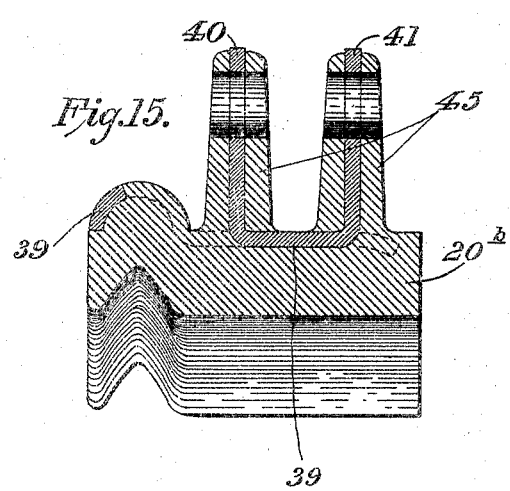
Figure 16:
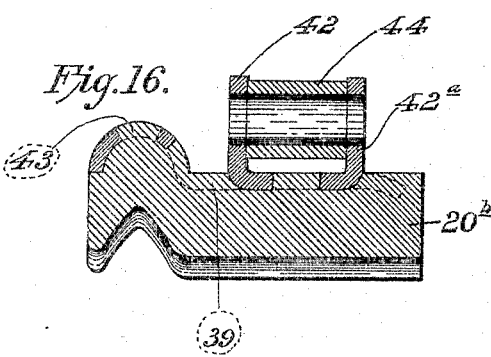

Figures 4, 5, and 6 are central vertical cross sections showing modifications of forming the attaching flanges for the brake beam and of embedding the same in the cast wearing shoe;

Figures 7, 8, and 9 show respectively, a side elevation, a plan and vertical cross section of a modification of the block in which the back and attaching flanges are made of two separate pieces;

Figures 10, and 12 show plan views of blanks from which a different form of attaching wing is made, especially for driver shoes, and Figure 11 is a central vertical cross section of such a shoe supplied with the plates shown in Figures 10 and 12;

Figures 13 and 14 are respectively, a side elevation and a top plan view, of a driver shoe made with a ductile or malleable backing and attaching means made from a single plate; and Figures 15 and 16 are sections respectively on lines (15) and (16) in Figure 13.

It is the present custom to use on the end of the brake beam a separate head for supporting the brake shoe, and the brake shoe is attached thereto by means of various lugs and pins and other connections. The ordinary cast brake shoes which are attached to the brake head have become displaced in heavy traffic to some extent on account of the great danger of breakage of the cast shoe and the difficulty of properly attaching it to the brake head without danger of cracking or breaking off the lugs in driving the keys. And in rough usage the cast shoe frequently fails by reason of the weak attaching means to the head. Also there is considerable difficulty experienced in fitting the shoe properly to the head and in preventing the rattling or looseness of the same which is both inconvenient and dangerous. In order to overcome these difficulties and others, I provide a wearing block with a backing which is provided with wings for attaching directly to the brake lever or beam itself, thus doing away with the separate head.

Thus in Figure 1, the body portion or wearing sole 20 of the shoe is provided with a backing 21 of malleable or ductile metal having a base portion for backing the shoe and two wings 22 which have eyes for engagement with the brake beam, the plate 21 being punched with openings 24 and lugs 24ª in order to allow anchorage in the cast metal and firmly attaching the backing to the wearing block itself. The backing may conveniently be forged of one piece and the cut-out portions 24ᵃ punched and turned as shown in Figure 2 and buried in the cast metal for additional security, the ends of the plate being also buried in the cast metal as will be evident. The upwardly projecting wings 22 forming the eyes for reception of the end of the brake beam 26 may either be left bare as shown in Figure 3 or may have the cast metal run up to form a filling 31 underneath the brake beam as shown in Figure 6. Otherwise the attaching back, as shown in Figure 4, may be made by bending the two flat portions 27 in contact, making them from a single piece, or in two pieces 27ᵃ as in Figure 5, the lower ends in each case being flanged at 28 and buried in the cast metal for secure anchorage therein. Also it will be seen that the flanges 27 may be bare as in Figure 4 or may be covered by the cast metal in whole or in part as shown in Figure 5, for additional strength. In the form of Figure 2, where the cast metal is not run up to support the wings 22 I may use a spool 25 to separate the two upon the brake beam, for additional security and stiffness.

The form of the back as shown in Figures 7 and 8 is made from two plates with their ends buried in the cast wearing sole as shown in Figure 9, and conveniently spaced apart by the spool 25. For additional security the lip 32ᵃ may be punched out of the side and buried in the cast metal, as shown in Figure 9.

Figure 10, 11, and 12 show a convenient mode of making the backing for a heavy driver shoe, the same being made from two plates 34 and 35 and the larger plate 35 being extended over the rim portion of the shoe and being provided with openings 36 which the cast metal flows through for thorough anchorage. The two wings 37 for attaching to the lever may either be left free or may be strengthened by filling in the cast metal 38 as shown in Figure 11. It will also be evident that punched out anchorage lugs such as indicated in Figure 7 may be used with these plates.

In Figures 13 to 15 is shown a different form of driver shoe in which the backing is made from a single plate. The plate 39 has the various lugs 40, 41, 42, and 42ᵃ punched out and turned up therefrom as shown in Figure 14, and is also provided with central openings and openings 43 over the flange portion, in order to secure additional anchorage in the sole cast thereon. I preferably arrange the molds in the casting of the sole upon the back so as to cover the attaching flange portions 40 and 41 with the cast metal as shown at 45 in Figure 15, thus making a more secure anchorage and stiffening the backing. In the small side lugs 42, 42ᵃ, I pursue the same process or more conveniently, as shown in Figure 16, may simply use a spool or spacer 44 between the two parts.

It will be seen from these illustrative constructions that I have provided a wearing brake shoe with a malleable or ductile metal backing which is anchored in the metal of the shoe in casting and makes practically an integral piece, doing away with the brake head entirely, and providing attaching means which are absolutely safe and may be made in any form desired to fit any kind of brake beam with perfect ease. Various other advantages of the construction will readily occur to those familiar with the art. And it is of course understood that in the claims the word "beam" is the equivalent of the lever used in the case of engine drivers.

Having thus described my invention and illustrated its use, what I claim as new, and desire to secure by Letters Patent, is the following:

1. A brake block having means for attachment directly to the brake lever or beam and a wearing sole directly cast thereon, substantially as described.

2. A brake block comprising a cast metal wearing sole and a ductile metal attaching flange for engagement directly with the brake beam, anchored in the cast metal, substantially as described.

3. A combined brake head and shoe consisting of a cast wearing sole and supporting means for the brake beam anchored therein, substantially as described.

4. The combination in a brake shoe of malleable metal attaching flanges to engage the brake beam and a cast wearing sole rigidly attached thereto.

5. In a brake shoe a cast wearing sole and a ductile metal strengthening back for the shoe, said back having integral therewith means for direct attachment to the brake beam.

6. A brake shoe having a reinforcement of wrought or ductile metal embedded therein in the act of casting, and said backing having perforated wings to engage directly with the brake beam.

7. A brake shoe having a cast wearing sole and a wrought or ductile metal backing embedded therein in casting, said backing being parallel with the wearing face of the shoe and having integral therewith attaching wings to engage directly with the brake beam, substantially as described.

8. A brake block comprising a cast wearing sole and a ductile metal engaging device for the brake beam embedded therein and comprising a single plate forged to shape.

9. In a brake block an attaching means for the brake beam comprising a single plate of ductile metal folded upon itself and anchored in the body of the wearing sole, substantially as described.

10. In a brake block, a cast wearing sole and a forged metal backing having attaching means for the brake beam, comprising two flanges spaced apart and having their bottoms buried in the cast body of the shoe, substantially as described.

In testimony whereof I have hereunder signed my name in the presence of the two subscribed witnesses.

FITZ WILLIAM SARGENT.

Witnesses:
M. B. JUSTICE,
E. W. VAN HOUTEN.